United States Patent
Hietalahti et al.

(10) Patent No.: US 11,985,050 B2
(45) Date of Patent: May 14, 2024

(54) UNIFIED DATA REPOSITORY SELECTION AND PARAMETERS THEREFOR

(71) Applicant: NOKIA TECHNOLOGIES OY, Espoo (FI)

(72) Inventors: Hannu Petri Hietalahti, Kiviniemi (FI); Ulrich Wiehe, Bad Hersfeld (DE); Francisco Rottura, Irving, TX (US); Jonathan Little, Stroud (GB); Michael Garner, Court Roswell, GA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/962,764

(22) Filed: Oct. 10, 2022

(65) Prior Publication Data
US 2023/0109782 A1    Apr. 13, 2023

Related U.S. Application Data

(60) Provisional application No. 63/253,882, filed on Oct. 8, 2021.

(51) Int. Cl.
*H04L 67/1097* (2022.01)
*H04L 43/02* (2022.01)
*H04L 43/04* (2022.01)

(52) U.S. Cl.
CPC .............. *H04L 43/02* (2013.01); *H04L 43/04* (2013.01)

(58) Field of Classification Search
None
See application file for complete search history.

(56) References Cited

U.S. PATENT DOCUMENTS

| | | | | |
|---|---|---|---|---|
| 11,609,906 | B1* | 3/2023 | Ghosh | G06F 16/2452 |
| 2016/0006709 | A1* | 1/2016 | Sakurai | H04L 63/08 726/6 |
| 2020/0104022 | A1* | 4/2020 | Nakashima | G06F 9/451 |
| 2020/0344130 | A1* | 10/2020 | Moore | H04L 41/147 |
| 2020/0404069 | A1* | 12/2020 | Li | H04W 8/24 |
| 2021/0195506 | A1* | 6/2021 | Bartolomé Rodrigo | H04L 67/51 |

OTHER PUBLICATIONS

3GPP TS 23.501 V17.2.0 (Sep. 2021), Technical Specification, 3rd Generation Partnership Project; Technical Specification Group Services and System Aspects; System architecture for the 5G System (5GS); Stage 2 (Release 17), Sep. 2021.

3GPP TS 23.502 V17.2.1 (Sep. 2021), Technical Specification, 3rd Generation Partnership Project; Technical Specification Group Services and System Aspects; Procedures for the 5G System (5GS); Stage 2 (Release 17), Sep. 2021.

(Continued)

*Primary Examiner* — Joshua Joo
(74) *Attorney, Agent, or Firm* — SQUIRE PATTON BOGGS (US) LLP

(57) ABSTRACT

Systems, methods, apparatuses, and computer program products for unified data repository selection and parameters that can be associated with such selection are provided. For example, a method can include identifying, by a network element, a capability of a repository to store data applicable to all user equipment devices in a network. The method can further include selecting, by the network element, the repository from a plurality of repositories based on the identified capability.

20 Claims, 6 Drawing Sheets

(56) References Cited

OTHER PUBLICATIONS

3GPP TS 23.502 V17.2.0 (Sep. 2021), Technical Specification, 3rd Generation Partnership Project; Technical Specification Group Services and System Aspects; Policy and charging control framework for the 5G System (5GS); Stage 2 (Release 17), Sep. 2021.
3GPP TS 29.510 V17.3.0 (Sep. 2021), Technical Specification, 3rd Generation Partnership Project; Technical Specification Group Core Network and Terminals; 5G System; Network Function Repository Services; Stage 3 (Release 17), Sep. 2021.

* cited by examiner

| Attribute name | Data type | P | Cardinality | Description |
|---|---|---|---|---|
| groupId | NfGroupId | O | 0..1 | Identity of the UDR group that is served by the UDR instance. If not provided, the UDR instance does not pertain to any UDR group. (NOTE 1) |
| supiRanges | array(SupiRange) | O | 1..N | List of ranges of SUPIs whose profile data is available in the UDR instance (NOTE 1) |
| gpsiRanges | array(IdentityRange) | O | 1..N | List of ranges of GPSIs whose profile data is available in the UDR instance (NOTE 1) |
| externalGroupIdentifiersRanges | array(IdentityRange) | O | 1..N | List of ranges of external groups whose profile data is available in the UDR instance (NOTE 1) |
| supportedDataSets | array(DataSetId) | O | 1..N | List of supported data sets in the UDR instance. If not provided, the UDR supports all data sets. |
| Any UE | array(DataSetId) | 9 | 1..N | List of data sets that are supported for Any UE operations. |

NOTE 1: If none of these parameters are provided, the UDR can serve any external group and any SUPI or GPSI managed by the PLMN of the UDR instance. If "supiRanges", "gpsiRanges" and "externalGroupIdentifiersRanges" attributes are absent, and "groupId" is present, the SUPIs / GPSIs / ExternalGroups served by this UDR instance is determined by the NRF (see 3GPP TS 23.501 [2], clause 6.2.6.2).

FIG. 4

| Data Set | Data Subset | Data Key | Data Sub Key |
|---|---|---|---|
| Subscription Data (see clause 5.2.3.3.1) | Access and Mobility Subscription data | SUPI | Serving PLMN ID and optionally NID |
| | SMF Selection Subscription data | SUPI | Serving PLMN ID and optionally NID |
| | UE context in SMF data | SUPI | PDU Session ID or DNN |
| | SMS Management Subscription data | SUPI | Serving PLMN ID and optionally NID |
| | SMS Subscription data | SUPI | Serving PLMN ID and optionally NID |
| | Session Management Subscription data | SUPI | S-NSSAI |
| | | | DNN Serving PLMN ID and optionally NID |
| | Slice Selection Subscription data | SUPI | Serving PLMN ID and optionally NID |
| | Group Data | Internal Group Identifier or External Group Identifier | - |
| | Identifier translation | GPSI | |
| | | SUPI | Application Port ID |
| | Intersystem continuity Context | SUPI | DNN |
| | LCS privacy | SUPI | - |
| | LCS mobile originated | SUPI | - |
| | UE reachability | SUPI | - |
| | Group Identifier Translation | Internal Group Identifier or External Group Identifier | - |
| | UE context in SMSF data | SUPI | - |
| | V2X Subscription data | SUPI | - |
| | ProSe Subscription data | SUPI | - |
| | Shared data affecting multiple UEs | Shared Data ID | |
| Application data | Packet Flow Descriptions (PFDs) | Application Identifier | - |
| | AF traffic influence request information (See clause 5.6.7 and clause 6.3.7.2 of TS 23.501 [2]) | AF transaction internal ID S-NSSAI and DNN and/or Internal Group Identifier or SUPI | |
| | Background Data Transfer (NOTE 3) | Internal Group Identifier or SUPI | |
| | Service specific information (See clause 4.15.6.7) | S-NSSAI and DNN or Internal Group Identifier or SUPI | |
| | AF provided ECS Address Configuration Information (See Table 4.15.6.3d-1) | AF transaction internal ID | S-NSSAI and DNN and one of any UE indication, Internal Group Identifier |
| | AM policy influence request information (See clause 4.15.6.9.3) | AF transaction internal ID S-NSSAI and DNN and/or Internal Group Identifier or SUPI | |

FIG. 5A

| | Time-Sync data (See clause 4.15.9.3) | DNN and S-NSSAI Internal Group ID SUPI | |
|---|---|---|---|
| Policy Data | UE context policy control data (See clause 6.2.1.3 of TS 23.503 [20]) | SUPI | |
| | PDU Session policy control data (See clause 6.2.1.3 of TS 23.503 [20]) | SUPI | S-NSSAI DNN |
| | Policy Set Entry data (See clause 6.2.1.3 of TS 23.503 [20]) | SUPI (for the UDR in HPLMN) | |
| | | PLMN ID (for the UDR in VPLMN) | |
| | Remaining allowed Usage data (See clause 6.2.1.3 of TS 23.503 [20]) | SUPI | S-NSSAI DNN |
| | Sponsored data connectivity profiles (See clause 6.2.1.6 of TS 23.503 [20]) | Sponsor Identity | |
| | Background Data Transfer data (See clause 6.2.1.6 of TS 23.503 [20]) | Background Data Transfer Reference ID (NOTE 2) None (NOTE 1) | |
| | Remaining Data Rate (See clause 6.2.1.3 of TS 23.503 [20]) | S-NSSAI | |
| Exposure Data (see clause 5.2.12.1) | Access and Mobility Information | SUPI or GPSI or "any UE" indication (NOTE 4) | PDU Session ID or |
| | Session Management information | SUPI or GPSI or "any UE" indication (NOTE 4) | UE IP address or DNN |

NOTE 1: Retrieval of the stored Background Data Transfer References for all ASP identifiers in the UDR requires Data Subset but no Data Key or Data Subkey(s).
NOTE 2: Update of a Background Data Transfer Reference in the UDR requires a Data key to refer to a Background Data Transfer Reference as input data.
NOTE 3: The Background Data Transfer includes the Background Data Reference ID and the ASP id that requests to apply the Background Data Reference ID to the UE(s). Furthermore, the Background Data Transfer includes the relevant information received from the AF as defined in clause 6.1.2.4 of TS 23.503 [20].
NOTE 4: "any UE" indication means an indication that all UEs are targeted.

FIG. 5B

UNIFIED DATA REPOSITORY SELECTION AND PARAMETERS THEREFOR

CROSS REFERENCE TO RELATED APPLICATION

This application claims the benefit of U.S. Provisional Application No. 63/253,882, filed Oct. 8, 2021. The entire content of the above-referenced application is hereby incorporated by reference.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing unified data repository selection and parameters that can be associated with such selection.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to perform identifying a capability of a repository to store data applicable to all user equipment devices in a network. The at least one memory and computer program code can also be configured, with the at least one processor, to cause the apparatus at least to perform selecting the repository from a plurality of repositories based on the identified capability.

An embodiment may be directed to an apparatus. The apparatus can include at least one processor and at least one memory comprising computer program code. The at least one memory and computer program code can be configured, with the at least one processor, to cause the apparatus at least to perform receiving, at a repository, a request for information regarding a capability of the repository to store data applicable to all user equipment in a network. The at least one memory and computer program code can also be configured, with the at least one processor, to cause the apparatus at least to perform providing a capability response indicating the capability when the repository is capable of storing data applicable to all user equipment in a network.

An embodiment may be directed to a method. The method can include identifying, by a network element, a capability of a repository to store data applicable to all user equipment devices in a network. The method can further include selecting, by the network element, the repository from a plurality of repositories based on the identified capability.

An embodiment may be directed to a method. The method can include receiving, at a repository, a request for information regarding a capability of the repository to store data applicable to all user equipment in a network. The method can further include providing, by the repository, a capability response indicating the capability when the repository is capable of storing data applicable to all user equipment in a network.

An embodiment may be directed to an apparatus. The apparatus may include means for identifying a capability of a repository to store data applicable to all user equipment devices in a network. The apparatus can further include means for selecting, by the network element, the repository from a plurality of repositories based on the identified capability.

An embodiment may be directed to an apparatus. The apparatus may include means for receiving, at a repository, a request for information regarding a capability of the repository to store data applicable to all user equipment in a network. The apparatus can further include means for providing a capability response indicating the capability when the repository is capable of storing data applicable to all user equipment in a network.

BRIEF DESCRIPTION OF THE DRAWINGS

For proper understanding of example embodiments, reference should be made to the accompanying drawings, wherein:

FIG. 4 illustrates an example definition of type UDRinfo, according to certain embodiments;

FIG. 5A illustrates an example of data key definitions, according to certain embodiments; and FIG. 5B illustrates a continuation of the example of FIG. 5A.

DETAILED DESCRIPTION

Figure 1:
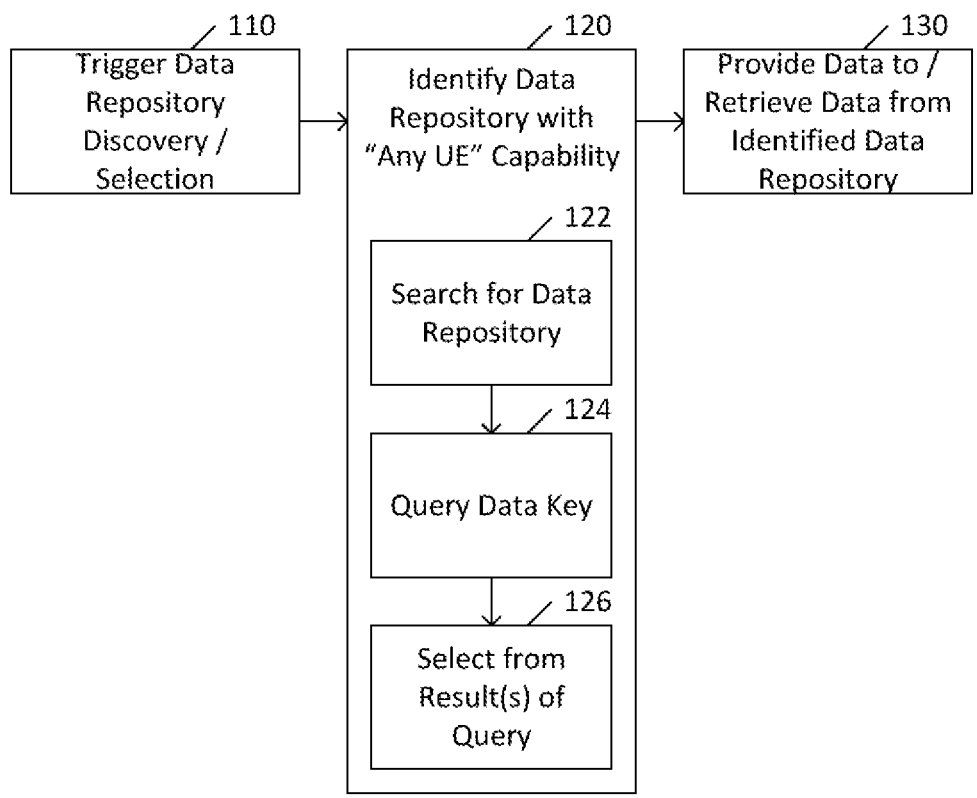
FIG. 1 illustrates an example flow diagram of a method for providing unified data repository selection and parameters that can be associated with such selection, according to certain embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing unified data repository selection and parameters that can be associated with such selection, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Unified data management (UDM) or any unified data manager may consider a user equipment (UE) identifier (ID) when selecting a unified data repository (UDR). Use of the UE identifier may allow, for example, regional or other segmented UDR deployment. The UE may be particularly beneficial for data that is subscription-related information stored in the UDR. However, shared data that can be common to multiple subscriptions, rather than being specific to a single subscription, may not benefit in the same way from the use of a user equipment identifier.

It is possible for certain operations to target "any UE". For example, it is possible to subscribe to notification events targeting either a single UE identified by UE ID, a group of UEs identified by an external group ID, or the use of an indication "any UE" or the like general identifier. In this context, "any UE" can refer to all UEs being targeted, for example all UEs in a public land mobile network (PLMN).

If segmented UDR is deployed, then the UDM may use the UE identifier when selecting the UDR that stores the subscription data for the target user. This approach may allow segmentation of UDR by subscriber, but it may not support the identification of the UDR that stores non-subscription specific data.

Certain embodiments address procedures for targeting "any UE" when handling a segmented UDR, as distinct from procedures for requesting traffic influencing or monitoring. A UDM can take into account various criteria when selecting a UDR. For example, the UDM can consider whether the UDR contains subscription data, exposure data, policy data, and/or application data. Data sets can follow a definition provided by a standard. Although data subsets may not have a standard definition, they may be logical divisions of data. For example, an arbitrary division of data into a subset can occur by dividing the data or an existing subset thereof into categories based on, for example, the user of the data or the type of data. The divisions could be done at various levels, down to the individual resource level. For example, there can be data sets A, B, and C and then data subsets of A-X, A-Y, A-Z, B-1, B-2, B-3, and C-I, C-J. Thus, a data subset can be viewed as being part of a data set. Also, see FIGS. 5A and 5B for examples of data sets, data subsets, data keys, and data subkeys.

As another option, the UDM can consider which UDR Group ID the UE's subscriber permanent identifier (SUPI) belongs to. The UDM can also or alternatively consider the UE's SUPI in other respects. For example, the UDR network function (NF) consumer can select a UDR instance based on the SUPI range to which the UE's SUPI belongs or based on the results of a discovery procedure with network repository function (NRF) using the UE's SUPI as input for UDR discovery. As another option or alternative the UDM can consider the general public subscription identifier (GPSI) or external group ID. For example, a UDR NF consumer can select a UDR instance based on the GPSI or External Group ID range to which the UE's GPSI or external group ID belongs, or based on the results of a discovery procedure with NRF using the UE's GPSI or external group ID as input for UDR discovery.

Keys for UDR selection can include attributes such as groupID, supiRanges, gpsiRanges, externalGroupIdentifiersRanges, and supportedDataSets. The attribute groupID can be the identity of the UDR group that is served by a UDR instance. A null value may imply that the UDR instance does not pertain to any UDR group. The supiRanges attribute can provide a list of ranges of SUPIs whose profile data is available in the UDR instance to which the supiRanges attribute applies. The gpsiRanges attribute can provide a list of ranges of GPSIs whose profile data is available in the UDR instance. The externalGroupIdentifiersRanges attribute can provide a list of ranges of external groups whose profile data is available in the UDR. The supportedDataSets attribute can provide a list of supported data sets in the UDR instance. FIG. 4 illustrates an example definition of type UDRinfo, according to certain embodiments. FIG. 4 illustrates a possible implementation by way of example, and not by way of limitation.

In certain cases, GroupID and supported data set can be used as a key in a discovery request, while SUPI range, GPSI range, and external group ID range cannot. Individual SUPI, individual GPSI, individual external group ID can be used as keys. The discovery process can match these individual ID values against the appropriate ranges stored by a UDR instance.

Certain embodiments provide a UDR selection procedure that can support segmented UDR deployment for the case of procedures where multiple UEs' information is desired, for example, where information regarding "any UE," for example all UEs in a PLMN, is desired. Certain embodiments may provide such features and other features by including UDR selection criteria that encompass the selection criteria described above, as well as the following selection criteria in any combination.

For example, an anyUE or "Any UE" attribute or the like can be included in the UDR selection procedure. The "Any UE" attribute can provide a list of data sets that are supported for "Any UE" operations. Moreover, data keys can accommodate the data identifiable with the "Any UE" attribute. For example, the data set of subscription data may include a data subset of shared data affecting multiple UEs. This data subset may be identified by a shared data ID data key. Moreover, the range of possible data keys for exposure data, including both access and mobility information and session management information, can include SUPI, GPSI, or "Any UE" as options.

Multiple instances of UDR may be deployed, each one storing specific data or providing service to a specific set of NF consumers. If an NF service consumer performs discovery and selection, the NF consumer can utilize the NRF to discover the appropriate UDR instance(s) unless UDR instance information is available by other means, for example the UDR information may be locally configured on the NF consumer.

Examples of information being locally configured can include, without limitation, information pre-loaded at the time of manufacture/service, a network pushed update, a download, or the like. In another example, the information locally configured can include network configuration done at deployment time or subsequently, for example when the network is expanded or reconfigured.

The UDR selection function in NF consumers can be applicable to both third generation partnership project (3GPP) access and non-3 GPP access. The NF consumer or the service communication proxy (SCP) may select a UDR instance that contains relevant information for the NF consumer. For example, the UDM/SCP can select a UDR instance that contains subscription data, while the network exposure function (NEF)/SCP, when used to access data for exposure, can select a UDR that contains data for exposure. As another option, the policy control function (PCF)/SCP can select a UDR that contains policy data and/or application data.

The UDR selection function in UDR NF consumers can consider the Data Set Identifier of the data to be managed in the UDR. Additionally, the UDR selection function in UDR NF consumers can consider any of the following factors when available to the UDR NF consumer. For example, one factor may be the UDR Group ID the UE's SUPI belongs to. Another factor may be the SUPI, as explained above. More particularly, the UDR NF consumer may select a UDR instance based on the SUPI range to which the UE's SUPI belongs or based on the results of a discovery procedure with NRF using the UE's SUPI as input for UDR discovery. A further factor may be GPSI or external group ID. For example, UDR NF consumers can select a UDR instance based on the GPSI or external group ID range to which the UE's GPSI or external group ID belongs, or based on the results of a discovery procedure with NRF using the UE's GPSI or external group ID as input for UDR discovery.

In certain embodiments, a further factor may be UDR capability to store data that is applicable on any UE, for example to store data that is applicable to all UEs in a given network. If the UDR support of "any UE" data is associated with data set(s), then the UDR NF consumer can select a UDR that supports the required data set affecting any UE.

FIG. 5A illustrates an example of data key definitions, according to certain embodiments and FIG. 5B illustrates a continuation of the example of FIG. 5A. FIGS. 5A and 5B illustrate a possible implementation by way of example, and not by way of limitation.

In the case of delegated discovery and selection, the NF consumer can include the available factors in the request towards SCP. For example, the "Any UE" attribute, or an equivalent attribute, can be used to indicate the factor of the UDR capability to store data that is broadly applicable, for example applicable to any UE.

As an additional aspect to allow further load sharing among the UDRs of a single network, a binding can be provided between the support of "any UE" and the data subset for which "any UE" operations are supported. Thus, an NF selecting the UDR can identify not only which UDRs are capable of supporting "any UE", but can also identify which UDRs support "any UE" for monitoring, "any UE" for traffic influencing, or the like.

The requester NF may provide an indication of required supported features of the NF. For example, the requester NF may indicate a requirement for UDR capability to store data that is applicable on any UE, for example all UEs. If the UDR support of "any UE" data is associated with data set(s), then the UDR NF consumer can select a UDR that supports the required data set affecting any UE.

FIG. 1 illustrates method for obtaining data associated with multiple user equipment devices from a data repository, according to certain embodiments. As shown in FIG. 1, a data repository discovery and/or selection process may be triggered at 110. This may be triggered within a network function that is a consumer of data from a unified data repository, or from a service communication proxy. The device performing this method may be considered the requester NF or a proxy for the requester NF.

Various events may trigger data repository discovery and/or selection. For example, registration of a UE may trigger a discovery of the UDR by a consumer NF to allow the registration process to complete based on the UE's subscription information stored in the UDR. There may be many other triggers, and this is just an example. Likewise, an explicit or implicit request from a consumer NF to a service communication proxy can be a trigger for the service communication proxy.

At 120, the method can include identifying a data repository, for example a UDR, with "Any UE" capability. For example, the identifying the data repository can include identifying a capability of a repository to store data applicable to all user equipment devices in a network. The capability can be variously identified. For example, the method can include, at 122, searching for the data repository. In the search, at 124, there can be a query for a data key, such as an "Any UE" data key. Thus, the method can include searching for a data key, for example searching for a shared data identifier.

The "any UE" designation, label, or key can be applicable to all UEs registered with an active subscription, all UEs including devices with an active subscription devices and those having an expired subscription, or even any UE, of any subscription state past, present, or future. The meaning may be context dependent. For example, in the context of a subscription to notifications, an "anyUE" subscription may apply to a UE that has not yet had the UE's own data provisioned in the system, so technically the UE may not exist from the standpoint of the network. The "anyUE" subscription may also apply to all other UEs that have already had data provisioned and may or may not be active.

At 126, as a result of the query, there may be one or more results from which one or more data repositories can be selected. For example, the method can include selecting the repository from a plurality of repositories based on the identified capability.

At 130, data can be provided to or retrieved from an identified data repository. The data provided to the data repository can be stored at the data repository, together with a data key indicative of the data being associated with "any UE," for example the data being associated with all UEs of a network.

In certain embodiments, the network can be a public land mobile network. For example, the network can be a radio access network, such as a LTE network, 5G or NR network.

In certain embodiments, the user equipment identified by "any UE" can be user equipment that have connected to, are connected to, and/or will connect to the network, either directly through an air interface or indirectly through a relay node. For example, any device that has used or will use a Uu interface to the network or that relies on PC5 connection to a device with a Uu interface to the network can be considered included within the "any UE" category.

It is noted that FIG. 1 is provided as one example embodiment of a method or process. However, certain embodiments are not limited to this example, and further examples are possible as discussed elsewhere herein.

Figure 2:
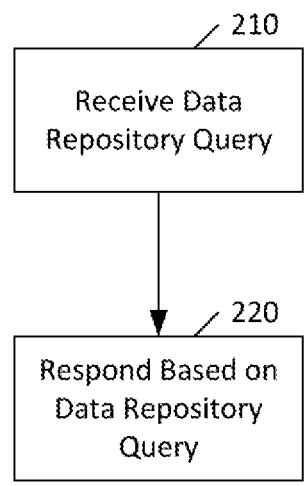
FIG. 2 illustrates another example flow diagram of a method for providing unified data repository selection and parameters that can be associated with such selection, according to certain embodiments.

FIG. 2 illustrates method for handling data repository queries, according to certain embodiments. As shown in FIG. 2, a device, such as a unified data repository, can receive a data repository query at 210. For example, the method can include receiving, at the repository, a request for information regarding a capability of the repository to store data applicable to all user equipment in a network. The method can also include, at 220, responding based on the data repository query. For example, the method can include providing a capability response indicating the capability when the respository is capable of storing data applicable to all user equipment in a network.

It is noted that FIG. 2 is provided as one example embodiment of a method or process. However, certain embodiments are not limited to this example, and further examples are possible as discussed elsewhere herein.

Figure 3A:
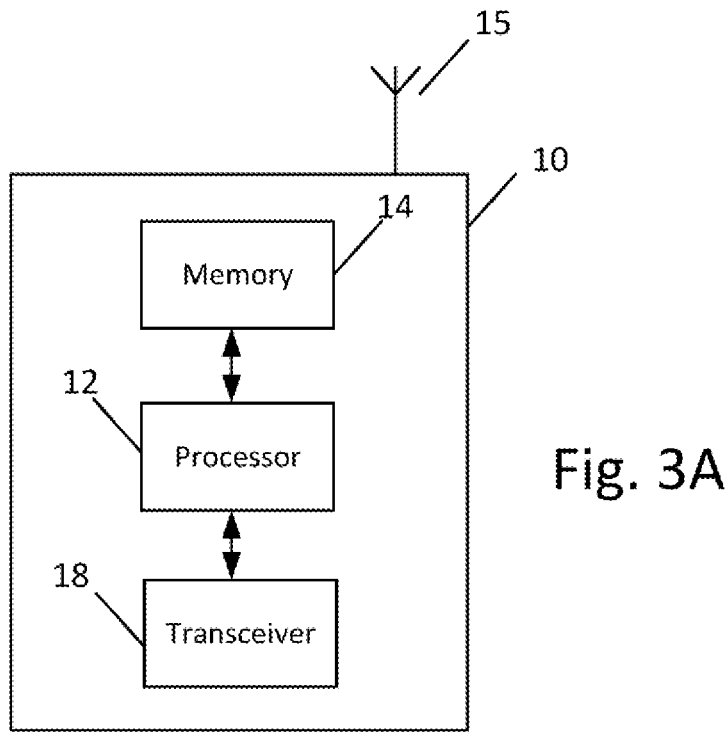
FIG. 3A illustrates an example block diagram of an apparatus, according to an embodiment.

FIG. 3A illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, satellite access, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 3A.

As illustrated in the example of FIG. 3A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 3A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrowband Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, satellite access, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-2, or any other method described herein. In some embodiments, as discussed herein, apparatus 10 may be configured to perform a procedure relating to providing unified data repository selection and parameters that can be associated with such selection, for example.

Figure 3B:
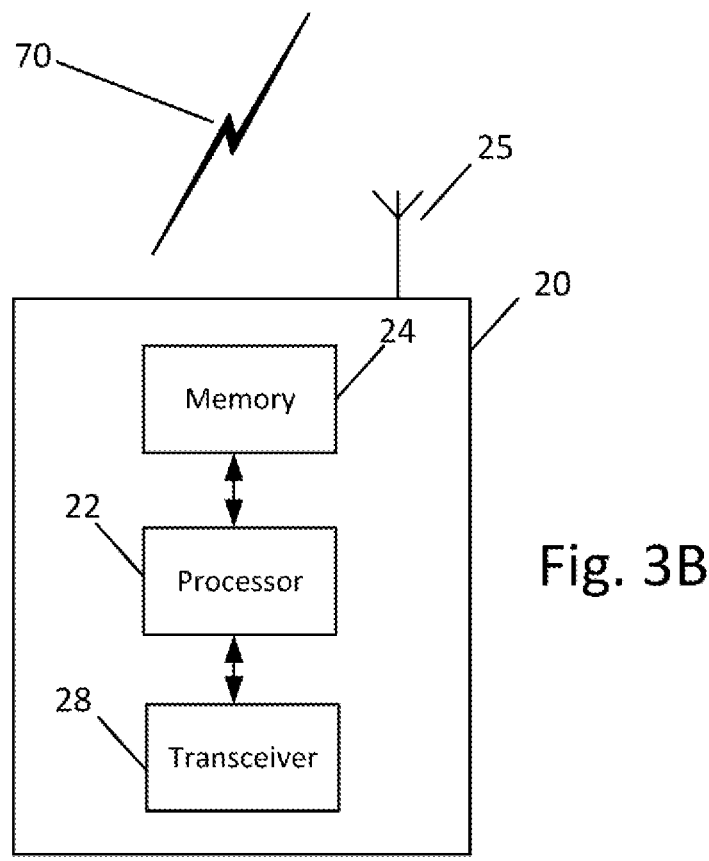
FIG. 3B illustrates an example block diagram of an apparatus, according to an embodiment.

FIG. 3B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3B.

As illustrated in the example of FIG. 3B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology, such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-2, or any other method described herein. For example, in an embodiment, apparatus 20 may be controlled to perform a process relating to providing unified data repository selection and parameters that can be associated with such selection, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, the approach of certain embodiments may permit greater usage of segmented UDRs that can also include storage of data that is applicable to all UEs in a network.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

GPSI General Public Subscription Identifier
NF Network Function
NRF Network Repository Function
SCP Service Communication Proxy
SUPI Subscription Permanent Identifier
UDM Unified Data Management
UDR Unified Data Repository
UE User Equipment

We claim:

1. An apparatus, comprising:
at least one processor; and
at least one memory including computer program instructions,
wherein the at least one memory and the computer program instructions are configured to, with the at least one processor, cause the apparatus at least to perform:
identifying a capability of a repository to store data applicable to all user equipment devices in a network that have previously connected to, are connected to, and will connect to the network; and
selecting the repository from a plurality of repositories based on the identified capability.

2. The apparatus of claim 1, wherein the repository comprises a unified data repository.

3. The apparatus of claim 1, wherein the apparatus comprises a network function that is a consumer of one or more unified data repositories.

4. The apparatus of claim 1, wherein the apparatus comprises a network function that is a service communication proxy for a consumer of one or more unified data repositories.

5. The apparatus of claim 1, wherein the identifying comprises searching for a data key.

6. The apparatus of claim 5, wherein the data key comprises a shared data identifier.

7. The apparatus of claim 1, wherein the identifying comprises identifying that the repository supports shared data affecting multiple user equipment.

8. The apparatus of claim 1, wherein the at least one memory and the computer program instructions are configured to, with the at least one processor, cause the apparatus at least to perform:
receiving, from a network function, instructions to perform a repository selection, wherein the identifying is triggered by the instructions.

9. The apparatus of claim 1, wherein the identifying the capability comprises further identifying a further capability of the repository to support at least one of monitoring for all user equipment devices or traffic influencing all user equipment.

10. An apparatus, comprising:
at least one processor; and
at least one memory including computer program instructions,
wherein the at least one memory and the computer program instructions are configured to, with the at least one processor, cause the apparatus at least to perform:
receiving, at a repository, a request for information regarding a capability of the repository to store data applicable to all user equipment in a network that have previously connected to, are connected to, and will connect to the network; and
providing a capability response indicating the capability when the repository is capable of storing data applicable to all user equipment in a network.

11. The apparatus of claim 10, wherein the repository comprises a unified data repository.

12. The apparatus of claim 10, wherein the request for information is received from a network function that is a consumer of one or more unified data repositories.

13. The apparatus of claim 10, wherein the request for information is received from a network function that is a service communication proxy for a consumer of one or more unified data repositories.

14. The apparatus of claim 10, wherein the request for information comprises a query for a data key.

15. The apparatus of claim 14, wherein the data key comprises a shared data identifier.

16. The apparatus of claim 10, wherein the request further comprises a query regarding a further capability of the repository to support at least one of monitoring for all user equipment devices or traffic influencing all user equipment.

17. A method, comprising:
identifying, by a network element, a capability of a repository to store data applicable to all user equipment devices in a network that have previously connected to, are connected to, and will connect to the network; and selecting, by the network element, the repository from a plurality of repositories based on the identified capability.

18. The method of claim 17, wherein the repository comprises a unified data repository.

19. The method of claim 17, wherein the network element comprises a network function that is a consumer of one or more unified data repositories.

20. The method of claim 17, wherein the network element comprises a network function that is a service communication proxy for a consumer of one or more unified data repositories.

* * * * *